3,342,833
PYRROLIDINE PRODUCTION FROM AZIRIDINES
AND OLEFINS
Maximilian I. Fremery, Oakland, Calif., assignor to Shell
Oil Company, New York, N.Y., a corporation of Delaware
No Drawing. Filed Aug. 7, 1964, Ser. No. 388,319
The portion of the term of the patent subsequent to
Jan. 11, 1983, has been disclaimed
9 Claims. (Cl. 260—326.3)

This invention relates to an improved method for the production of certain heterocyclic compounds. More particularly, it relates to an improved method for the production of disubstituted pyrrolidines.

Numerous methods are available in the art for the production of pyrrolidines. Among these are the cyclization of α,δ-aminoalcohols, reaction of tetrahydrofurans with ammonia or primary amines, and reduction of pyrroles or succinimides. Such methods, although capable of producing substituted pyrrolidines, have the inherent disadvantage of requiring a series of synthetic operations and/or requiring economically expensive materials as reactants. It would be of considerable advantage to provide a more efficient and economical process for the production of substituted pyrrolidines.

It is an object of the present invention to provide an improved method for the production of certain heterocyclic compounds. A more particular object is to provide an improved method for the production of certain N-substituted pyrrolidines wherein an additional substituent is present on the carbon atom beta to the nitrogen moiety of the five-membered heterocyclic ring.

It has now been found that these objects were accomplished by reacting hydrocarbon N-substituted aziridines with activated olefins at elevated temperature. Under the conditions of the process of the invention, 1,3-disubstituted pyrrolidines are produced in comparably high yield in a one-step process.

The aziridine reactants employed in the process of the invention, which are also referred to as enimines, contain a three-membered heterocyclic ring comprising one atom of nitrogen and two atoms of carbon, the nitrogen atom of which is substituted with a hydrocarbyl substituent. Suitable N-hydrocarbyl aziridines are hydrocarbon aziridines, that is, contain only atoms of carbon and hydrogen besides the nitrogen moiety of the three-membered heterocyclic ring, and are preferably free from non-aromatic unsaturation. Exemplary compounds of this class contain from 3 to 10 carbon atoms, preferably from 3 to 6, and are represented by the formula

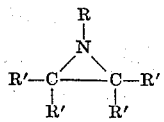

wherein R is alkyl having from 1 to 8 carbon atoms, aralkyl having from 1 to 8 carbon atoms, phenyl or alkaryl having 6 to 8 carbon atoms, and R' is hydrogen or R. Illustrative of such compounds are N-methylethylenimine (1-methylaziridine), N-butylethylenimine, 1,2-diethylaziridine, 1,2,3-tripropylaziridine, 1,2,2-trimethylaziridine, 1,2-dibutylaziridine, N-phenylethylenimine, 1,2,3-triethylaziridine, 1-methyl-2-tolylaziridine, N-benzylethylenimine, N-amylethylenimine, 1-hexyl-2-methylaziridine and the like. Preferred aziridines of the above formula contain no aromatic moieties, i.e., are hydrocarbon aliphatic N-substituted aziridines, and further preferred are the above-depicted aziridines wherein the carbon atoms of the heterocyclic ring are unsubstituted, that is, all R' groups are hydrogen; these are N-alkylethylenimines wherein the alkyl group has from 1 to 8 carbon atoms, preferably from 1 to 4. Particularly preferred as the aziridine reactant is N-methylethylenimine.

In the process of the invention, the aziridine is reacted with an activated olefin. By the term "activated olefin" is meant an organic compound containing an ethylenic linkage, i.e., a non-aromatic carbon-carbon double bond, wherein the chemical character of the ethylenic linkage has been altered, herein termed "activated," by the presence within the molecule of a non-hydrocarbyl substituent, preferably attached to an ethylenically bonded carbon atom, by conjugation with other carbon-carbon unsaturation, which may be aromatic and which is preferably non-acetylenic, or both. The activated olefins are therefore substituted hydrocarbon olefins and/or conjugated olefins. Preferred activated olefins contain no acetylenic linkages or active hydrogen atoms, and contain from 2 to 8 carbon atoms with no more than 10 atoms in the longest continuous atomic chain. When the olefin is substituted hydrocarbon it preferably contains only atoms of halogen, nitrogen, oxygen or sulfur, besides carbon and hydrogen, incorporated in functional groups such as halo, nitro, cyano, acyl, acyloxy, carboalkoxy, carboaryloxy, sulfonyl, thiohydrocarbyl, thiono, hydrocarbyloxy, dihydrocarbylamino, pyridinyl, N-pyrrolidinyl and the like. Of course, such substituents as hydroxy, amino and carboxy are not suitable due to the presence of active hydrogen atoms within these groups.

Exemplary substituted hydrocarbon olefins include acrylonitrile, ethyl acrylate, vinyl acetate, allyl chloride, vinyl benzoate, 2-bromo-3-heptene, propenyl butyrate, methyl vinyl sulfone, crotononitrile, methyl crotonate, methyl vinyl ketone, vinyl fluoride, methyl vinyl ether, 4-iodo-1-butene, 6-fluoro-1-nonene, p-nitrostyrene, N-vinylbutyrolactam, butyl acrylate, butyl allyl ether, 1-cyanocyclohexene, 5-chloro-1-pentene, 3-butenyl methyl sulfide, ethyl propenyl ketone, allyl methanesulfonate, 5-dimethylamino-2-pentene and the like, while exemplary conjugated olefins include butadiene, isoprene, chloroprene, 1,3-pentadiene, 2,4-hexadiene, 1,3-octadiene, 6-fluoro-1,3-heptadiene, methyl butadienyl sulfone, 1,3-cyclohexadiene, 1-vinylcyclohexene, styrene, 1-dimethylamino-1,3-butadiene p-ethylstyrene and 6-iodo-1,3-hexadiene.

Preferred olefins are acyclic olefins, that is, contain an ethylenic linkage that is not a portion of a cyclic ring system, and further preferred to those acyclic activated olefins wherein the ethylenic linkage is terminal. Best results are obtained when an acyclic, activated terminal olefin having from 2 to 5 carbon atoms is employed, particularly those wherein the single activated group is cyano, carboalkoxy, halogen of atomic number from 9 to 35, or vinyl, attached directly to one of the ethylenic carbon atoms.

Without wishing to be bound by any specific theory, it appears that the process of the invention involves thermal cleavage of a carbon-nitrogen bond of the aziridine ring to form a 1,3-diradical and subsequent 1,3-cycloaddition of the diradical thereby produced to the ethylenic linkage of the activated olefin to form the five-membered pyrrolidine ring. In view of the highly reactive character of free radicals as well as the polymerizable character of olefins under the elevated temperature of the reaction, it is surprising that high selectivity towards the 1,3-cycloaddition process is observed.

The reaction process is conducted at temperatures above that required for aziridine ring cleavage, but below temperatures at which extensive polymerization of the reacting species or the products obtained therefrom is observed. Suitable temperatures vary from about 250° C. to about 500° C., although temperatures from about 300° C. to about 450° C. are preferred.

The efficiency of the production of substituted pyrrolidine is favored by an excess of the olefin reactant whereby the likelihood of olefin "trapping" of the diradical species is increased. The olefin reactant is therefore preferably employed in molar excess over the aziridine. From practical considerations, however, utilization of too great an excess of activated olefin renders process operation and product recovery more difficult due to the large bulk of the reaction mixture. Molar ratios of activated olefin to N-substituted aziridine from about 1.5:1 to about 50:1 are generally satisfactory, while molar ratios of from about 2:1 to about 10:1 are preferred.

The process of the invention is conducted in a manner whereby the contact time of the reactants may be controlled, as utilization of too great a reaction time may result in undesirable side reactions. Thus, although batchwise processes are not precluded, it is generally preferred to conduct the process in a continuous manner. In a preferred modification of a continuous reaction process, the reaction is conducted in the vapor phase, as by passing a gaseous mixture of olefin and aziridine through a reactor maintained at the desired reaction temperature. The reactants are mixed prior to or simultaneously with introduction into the reactor which is customarily tubular in form. In this case of reactants which are normally liquid at or about ambient temperature, it is frequently desirable to employ preheating means to promote extensive vaporization prior to mixing or to introduction into the reactor. Best results are obtained when the reactor is packed with an inert material, e.g., glass helices, to promote more even heat transfer. Customarily the excess of olefin or alternatively an inert gas such as nitrogen, helium, argon, methane or the like is employed as a transfer agent to facilitate passage of the gaseous reactants through the reactor. The reaction is conducted at any convenient pressure, and although superatmospheric or subatmospheric pressures may be employed, the use of reaction pressures that are substantially atmospheric, e.g., from about 0.5 atmosphere to about 2 atmospheres, is preferred. The pressure employed and the rate of reactant introduction largely control the residence time of the reactants in the reactor. Residence times from about 0.5 minute to about 10 minutes are typical, although residence times from about 1 minute to about 7 minutes are preferred. Subsequent to passage through the reactor, the effluent is condensed and the product mixture is separated by conventional means such as fraction distillation, selective extraction, crystallization or the like.

The products of the invention are disubstituted pyrrolidines illustratively produced by cleavage of the N-substituted aziridine ring and 1,3-cycloaddition of the resulting diradical to the ethylenic linkage of the activated olefin. When the process is conducted employing N-methylethylenimine and acrylonitrile as reactants, the process is illustrated by the equation below.

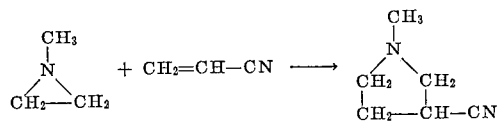

As illustrated, when the ethylenic linkage is terminal, the ring-carbon substituent is located on the carbon atom beta to the nitrogen moiety. When other substituted aziridines or internal olefins are employed, a variety of substituted pyrrolidines results. For example, from the reaction of N-propylethylenimine and ethyl crotonate is obtained 1-propyl-2-methyl-3-carbethoxy-pyrrolidine. Other illustrative products include 1-ethyl-3-fluoropyrrolidine, 1-methyl-3-chloromethylpyrrolidine, 1,5-dimethyl-3 - acetylpyrrolidine, 1-phenyl-3-vinylpyrrolidine, 1,2-dimethyl-3-cyanopyrrolidine, 1-benzyl-3-acetoxypyrrolidine, 1-hexyl-3 - dimethylaminopyrrolidine, 1-ethyl - 3-methylsulfonylpyrrolidine and the like.

The products of the process of the invention find utility as solvents and as chemical intermediates, particularly in the production of agricultural chemicals, e.g., insecticides and sterilants, and pharmaceutical chemicals. The great number of functional groups easily introduced onto the pyrrolidine ring allows the formation of numerous conventional ester, alcohol, amide, ether and amine derivatives. Products formed from conjugated dienes retain available unsaturation in the β-substituent which serves as a reactive site for polymerization or copolymerization processes or alternatively may be epoxidized to form useful epoxy resin precursors. The pyrrolidines are reacted with acids to form useful pyrrolidinium salts, or with hydrogen peroxide or other oxidizing agents to produce useful pyrrolidine-N-oxides.

To further illustrate the novel process of the invention, the following examples are provided. It should be understood that the details thereof are not to be regarded as limitations, as the teachings thereof may be varied as will be understood by one skilled in this art.

EXAMPLE I

The vapor-phase reactor employed in this and the following examples was a vertically mounted stainless steel tube having an internal diameter of 0.75 inch and a length of about 2 feet. The reactor was equipped with a co-axial thermocouple well and a thermoelectric-controlled heating furnace and was packed with glass helices.

To the reactor maintained at 375° C., within a 5 hour period was introduced 10 g. of N-methylethylenimine, 52 g. of ethyl acrylate and 0.2 g. of hydroquinone. Nitrogen, introduced at the rate of 35 cc./min., was utilized as the transport gas. After a residence time of from 2 to 5 minutes, the reaction products were collected in an ice and Dry Ice trap. Fractional distillation of the condensate gave approximately 1 g. of unreacted N-methylethylenimine, 32 g. of unreacted ethyl acrylate and 22 g. of 1-methyl-3-carbethoxypyrrolidine, B.P. 69° C. at 10 mm., which represented a yield of 80% based on the aziridine charged. The mass spectrographic analysis and nuclear magnetic resonance spectrum were consistent with the above formula.

The elemental analysis was as follows:
Analysis.—Calc., percent weight: C, 58.7; H, 9.1; N, 9.8. Found: C, 58.5; H, 9.3; N, 10.7.

EXAMPLE II

By a procedure similar to that of Example I, a mixture of 10 g. of N-methylethylenimine and 28 g. of acrylonitrile was introduced to the reactor maintained at 375° C. Fractional distillation of the condensed effluent afforded approximately 1 g. of recovered aziridine, 20 g. of unreacted acrylonitrile and 13.5 g. of 1-methyl-3-cyanopyrrolidine, B.P. 85° C. at 25 mm., which represented a 70% yield based upon the aziridine charged. Identification of the product was by mass spectrographic and nuclear magnetic resonance analysis. Elemental analysis was as follows:
Analysis.—Calc. percent weight: C, 65.5; H, 9.1; N, 25.4. Found: C, 66.2; H, 8.9; N, 25.0.

EXAMPLE III

The procedure of Example I was repeated employing a gaseous mixture of 10 g. of N-methylethylenimine and 30 g. of butadiene and nitrogen, introduced at the rate of 35 cc./min. as a carrier gas. Fractional distillation of the condensed reactor effluent subsequent to evaporation of approximately 20 g. of unreacted butadiene afforded less than 0.5 g. of unreacted aziridine and 19 g. of 1-methyl-3-vinylpyrrolidine, B.P. 120° C. at 764 mm., which represented a yield of 98% based on the aziridine charged. Identification of the product was made by infrared, mass spectrographic and nuclear magnetic resonance analysis.

Similar results are obtained when N-proylethylenimine is employed as the aziridine reactant.

EXAMPLE IV

Under reaction conditions similar to those of Example I, reaction of 10 g. of N-methylethylenimine and 45 g. of vinyl acetate resulted in the recovery of 2.5 g. of unreacted aziridine, 28 g. of vinyl acetate and 14 g. of 1-methyl-3-acetoxypyrrolidine, B.P. 62° C. at 15 mm., which represented a yield of 55% based on aziridine charged. The mass spectrographic and nuclear magnetic resonance spectra were consistent with the above formula. The elemental analysis was as follows:

*Analysis.*—Calc. percent weight: C, 61.1; H, 9.6; N, 8.9. Found: C, 60.8; H, 9.7; N, 8.7.

Example V

To the above-described reactor was introduced within a 5 hour period 10 g. of N-methylethylenimine as a liquid together with nitrogen (flow rate of 35 cc./min.) as transport gas and 24 g. of vinyl fluoride. Fractional distillation of the condensed effluent afforded approximately 2 g. of the unreacted aziridine, 18 g. of unreacted vinyl fluoride and 7.2 g. of 1-methyl-3-fluoropyrrolidine, B.P. 86° C. at 763 mm., which represented a yield of 40% based on the aziridine charged. The mass spectrographic and nuclear magnetic resonance analyses were consistent with the above formula.

EXAMPLE VI

To an autoclave was charged 100 g. of butyl vinyl ether, and a mixture of 10 g. of N-methylethylenimine and 10 g. of butyl vinyl ether was added thereto over a 5 hour period while the reaction mixture was maintained at 325° C. The reactor was then cooled and opened, and subsequent to the removal of excess butyl vinyl ether by distillation, the product mixture was fractionally distilled to give approximately 15 g. of N-methylpyrrolidine butyl ether, B.P. 82° C. at 25 mm., which was identified by mass spectrographic analysis. The yield was 54% based on the aziridine charged.

EXAMPLE VII

When N-phenylethylenimine is reacted with 2,4-hexadiene in the vapor phase in a tubular reactor maintained at 400° C., a good yield of 1-phenyl-2-methyl-3-(2-propenyl)pyrrolidine is obtained.

I claim as my invention:

1. The process of producing a 1,3-di-substituted pyrrolidine by reacting the N-hydrocarbyl aziridine of from 3 to 10 carbon atoms of the formula

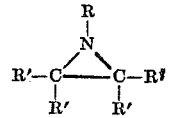

wherein R is alkyl, aralkyl, phenyl or alkaryl, and R' is hydrogen or R, with a non-acetylenic activated olefin having from 2 to 8 carbon atoms and having no more than 10 atoms in the longest continuous atomic chain, said activated olefin being selected from the group consisting of conjugated hydrocarbon olefins and substituted hydrocarbon olefins wherein the substituent group is selected from halo, acyloxy, hydrocarbyloxy, cyano, and carboalkoxy, in the vapor phase, at a temperature from about 250° C. to about 500° C.

2. The process of claim 1 wherein the aziridine is N-alkylethylenimine wherein the alkyl has from 1 to 8 carbon atoms.

3. The process of producing a 1,3-di-substituted pyrrolidine by reacting the hydrocarbon aziridine having from 3 to 10 carbon atoms of the formula

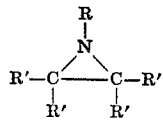

wherein R is alkyl and R' is hydrogen or R, with non-acetylenic hydrocarbon conjugated olefinic compound having up to 8 carbon atoms, in the vapor phase, at a temperature from about 250° C. to about 500° C.

4. The process of producing a 1,3-di-substituted pyrrolidine by reacting N-alkylethylenimine wherein the alkyl has from 1 to 8 carbon atoms with acyclic, non-acetylenic, activated terminal olefin having from 2 to 5 carbon atoms wherein the single activating group is attached directly to one of the ethylenic carbon atoms and is selected from the group consisting of cyano, carboalkoxy, halogen of atomic number from 9 to 35, and vinyl, in the vapor phase, at a temperature from about 300° C. to about 450° C.

5. The process of claim 4 wherein the olefin is acrylonitrile.

6. The process of claim 4 wherein the olefin is ethyl acrylate.

7. The process of claim 4 wherein the olefin is butadiene.

8. The process of claim 3 wherein the conjugated olefin is butadiene.

9. The process of claim 3 wherein the conjugated olefin is styrene.

References Cited

UNITED STATES PATENTS 3,228,957   1/1966   Fremery _____ 260—326.8

ALEX MAZEL, *Primary Examiner.*

HENRY R. JILES, *Examiner.*

M. U. O'BRIEN, J. A. NARCAVAGE,
*Assistant Examiners.*